(12) United States Patent
Nakazawa (10) Patent No.: US 7,110,667 B2
(45) Date of Patent: Sep. 19, 2006

(54) AUTO FOCUS APPARATUS

(75) Inventor: Michitaka Nakazawa, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 185 days.

(21) Appl. No.: 10/939,363

(22) Filed: Sep. 14, 2004

(65) Prior Publication Data

US 2005/0063694 A1    Mar. 24, 2005

(30) Foreign Application Priority Data

Sep. 18, 2003   (JP)   ............................. 2003-325614

(51) Int. Cl.
*G03B 13/36* (2006.01)

(52) U.S. Cl. ........................................ 396/97; 348/349

(58) Field of Classification Search ................. 396/397
See application file for complete search history.

(56) References Cited

U.S. PATENT DOCUMENTS 6,023,589 A * 2/2000 Ohta ............................ 396/80

FOREIGN PATENT DOCUMENTS

| JP | 11-142714 A | 5/1999 |
|----|-------------|--------|
| JP | 2003-131106 A | 5/2003 |

* cited by examiner

*Primary Examiner*—W. B. Perkey
(74) *Attorney, Agent, or Firm*—Sughrue Mion, PLLC (57) ABSTRACT

An auto focus apparatus of the present invention comprises a first temperature detection device, a second temperature detection device, a reference driving range storage device, a correction information storage device, a reference driving range acquisition device, a correction information acquisition device, a driving range setting device, and a driving control device.

3 Claims, 12 Drawing Sheets

| REFERENCE DRIVING RANGE SETTING TABLE ||  |
|---|---|---|
| DETECTED TEMPERATURE $T_1$ OF FIRST TEMPERATURE SENSOR (°C) | FOCUS MOTOR REFERENCE DRIVING RANGE $P_o$ (PULSES) ||
| | Near SIDE | inf SIDE |
| 55 | 0 | 40 |
| 50 | 5 | 45 |
| 45 | 10 | 50 |
| 40 | 15 | 55 |
| 35 | 20 | 60 |
| 30 | 25 | 65 |
| 25 | 30 | 70 |
| 20 | 35 | 75 |
| 15 | 40 | 80 |
| 10 | 45 | 85 |
| 5 | 50 | 90 |
| 0 | 55 | 95 |
| −5 | 60 | 100 |

FIG.6

CORRECTION TABLE

| $(T_1-T_2)<-T_0$ | | $-T_0 \leqq (T_1-T_2) \leqq T_0$ | | $T_0 < (T_1-T_2)$ | |
|---|---|---|---|---|---|
| Near SIDE | inf SIDE | Near SIDE | inf SIDE | Near SIDE | inf SIDE |
| ±0 | +15 | −5 | +5 | −15 | ±0 |

RELATIONSHIP BETWEEN LENS TEMPERATURE
AND DETECTED TEMPERATURE $T_2$ OF SECOND
TEMPERATURE SENSOR WHEN $T_1 = 25°C$

| DETECTED TEMPERATURE $T_2$ OF SECOND TEMPERATURE SENSOR (°C) | LENS TEMPERATURE (°C) | | TEMPERATURE DIFFERENCE $(T_1 - T_2)$ |
|---|---|---|---|
| | MAX | MIN | |
| 55 | 25 | 10 | -30 |
| 50 | 25 | 12.5 | -25 |
| 45 | 25 | 15 | -20 |
| 40 | 25 | 17.5 | -15 |
| 35 | 25 | 20 | -10 |
| 30 | 25 | 22.5 | -5 |
| 25 | 25 | 25 | 0 |
| 20 | 27.5 | 25 | 5 |
| 15 | 30 | 25 | 10 |
| 10 | 32.5 | 25 | 15 |
| 5 | 35 | 25 | 20 |
| 0 | 37.5 | 25 | 25 |
| -5 | 40 | 25 | 30 |

THRESHOLD $T_0$ IS SET TO 10°C SO THAT TEMPERATURE DIFFERENCE
BETWEEN DETECTED TEMPERATURE $T_1$ OF FIRST TEMPERATURE
SENSOR AND LENS TEMPERATURE IS CONFINED WITHIN 5°C.

FIG.8

DRIVING RANGE SETTING TABLE

| DETECTED TEMPERATURE T₁ OF FIRST TEMPERATURE SENSOR (°C) | (T₁−T₂)<−T₀ | | −T₀≦(T₁−T₂)≦T₀ | | T₀<(T₁−T₂) | |
|---|---|---|---|---|---|---|
| | Near SIDE ±0 | inf SIDE +15 | Near SIDE −5 | inf SIDE +5 | Near SIDE −15 | inf SIDE ±0 |
| 55 | 0 | 55 | 0 | 45 | 0 | 40 |
| 50 | 5 | 60 | 0 | 50 | 0 | 45 |
| 45 | 10 | 65 | 5 | 55 | 0 | 50 |
| 40 | 15 | 70 | 10 | 60 | 0 | 55 |
| 35 | 20 | 75 | 15 | 65 | 5 | 60 |
| 30 | 25 | 80 | 20 | 70 | 10 | 65 |
| 25 | 30 | 85 | 25 | 75 | 15 | 70 |
| 20 | 35 | 90 | 30 | 80 | 20 | 75 |
| 15 | 40 | 95 | 35 | 85 | 25 | 80 |
| 10 | 45 | 100 | 40 | 90 | 30 | 85 |
| 5 | 50 | 100 | 45 | 95 | 35 | 90 |
| 0 | 55 | 100 | 50 | 100 | 40 | 95 |
| −5 | 60 | 100 | 55 | 100 | 45 | 100 |

AUTO FOCUS APPARATUS

BACKGROUND OF THE INVENTION

1. Field of the Invention

The present invention relates to an auto focus apparatus, and more particularly, to an auto focus apparatus of a camera using plastic lenses for a photographing optical system.

2. Description of the Related Art

A plastic lens can be easily formed using a metal die, has a high degree of flexibility in the shape and can be manufactured at lower cost than a glass lens, and therefore an increasing number of cameras use plastic lens in a photographing optical system.

However, since plastic has a larger thermal expansion coefficient with respect to a temperature variation than glass and a disadvantage of plastic is that when used for a lens, an image forming position may vary depending on an environment in which the lens is used.

Therefore, the range (in-focus state search range) of driving a focus lens of a camera using plastic lenses is often set with a certain margin to allow focusing even when an in-focus position changes due to a temperature variation.

However, setting the range of driving a focus lens with a certain margin may cause the focus lens to be driven up to a point at which there could be originally no in-focus position, with the result that focusing takes a longer time.

Therefore, it is a conventional practice that the temperature of an optical system is detected by a temperature detection device, a temperature variation from a reference temperature is calculated, an amount of deviation of the in-focus position due to the temperature variation is calculated, and the focus driving range at the reference temperature is corrected so as to shorten the time required for focusing (e.g., Japanese Patent Application Publication No. 11-142714).

Furthermore, an amount of correction of the focus driving section with respect to a temperature variation around the lens is stored in a storage section beforehand and when a temperature variation occurs, the focus driving section is controlled based on information on the amount of correction stored in the storage section to prevent deviation of the in-focus position due to the temperature variation (e.g., Japanese Patent Application Publication No. 2003-131106).

SUMMARY OF THE INVENTION

However, when the temperature changes rapidly, a gap is produced between the temperature detected by a sensor and the actual temperature in the plastic lens, and therefore the conventional method has a disadvantage of having a possibility of being unable to detect the in-focus position. Moreover, setting the focus driving range in consideration of a drastic temperature variation has a disadvantage that the effect of shortening the focus detection time is reduced.

The present invention has been implemented in view of such circumstances and it is an object of the present invention to provide an auto focus apparatus capable of shortening a focus detection time.

In order to attain the above described object, a first aspect of the present invention is an auto focus apparatus which moves part of a photographing lens through a lens driving device, detects an in-focus position of an object image formed on a photo-receiving surface using an in-focus position detection device and moves the part of the photographing lens to the in-focus position to be detected, comprising a first temperature detection device which detects a temperature inside a lens barrel of the photographing lens, a second temperature detection device which detects a temperature outside the lens barrel of the photographing lens, a reference driving range storage device which stores setting information on a reference driving range of the lens driving device according to the detected temperature of the first temperature detection device, a correction information storage device which stores correction information on the reference driving range of the lens driving device according to a temperature difference between the detected temperature of the first temperature detection device and the detected temperature of the second temperature detection device, a reference driving range acquisition device which acquires the detected temperature of the first temperature detection device and acquires the reference driving range of the lens driving device according to the detected temperature from the reference driving range storage device, a correction information acquisition device which acquires the detected temperature of the first temperature detection device and the detected temperature of the second temperature detection device, calculates a difference between the two detected temperatures and acquires correction information on the reference driving range of the lens driving device according to the difference from the correction information storage device, a driving range setting device which corrects the reference driving range of the lens driving device acquired by the reference driving range acquisition device based on the correction information acquired by the correction information acquisition device and sets a driving range of the lens driving device, and a driving control device which drives the lens driving device within the driving range set by the driving range setting device.

According to the first aspect of the present invention, the temperature inside the lens barrel of the photographing lens is detected by the first temperature detection device and the temperature outside the lens barrel of the photographing lens is detected by the second temperature detection device. The reference driving range acquisition device acquires the reference driving range of the lens driving device based on the detected temperature of the first temperature detection device from the reference driving range storage device. Furthermore, the correction information acquisition device acquires the correction information on the reference driving range based on the difference between the detected temperature of the first temperature detection device and the detected temperature of the second temperature detection device from the correction information storage device. The driving range setting device corrects the reference driving range of the lens driving device acquired by the reference driving range acquisition device based on the correction information acquired by the correction information acquisition device and sets the driving range of the lens driving device. The driving control device drives the lens driving device within the driving range set by the driving range setting device. In this way, even if a drastic temperature variation occurs, it is possible to drive the lens driving device within an appropriate range and achieve focusing in a short time accurately.

In order to attain the above described object, a second aspect of the present invention is an auto focus apparatus which moves part of a photographing lens through a lens driving device, detects an in-focus position of an object image formed on a photo-receiving surface using an in-focus position detection device and moves the part of the photographing lens to the in-focus position to be detected, comprising a temperature detection device which detects the temperature inside the lens barrel of the photographing lens, a reference driving range storage device which stores setting information on a reference driving range of the lens driving device according to the detected temperature of the temperature detection device, a correction information storage device which stores correction information on a reference driving range of the lens driving device according to a temperature variation that occurs within a specified time, a reference driving range acquisition device which acquires the detected temperature of the temperature detection device and acquires the reference driving range of the lens driving device according to the detected temperature from the reference driving range storage device, a correction information acquisition device which acquires the detected temperature of the temperature detection device for every specified time, obtains a temperature variation and acquires correction information on the reference driving range of the lens driving device according to the temperature variation from the correction information storage device, a driving range setting device which corrects the reference driving range of the lens driving device acquired by the reference driving range acquisition device based on the correction information acquired by the correction information acquisition device and sets the driving range of the lens driving device, and a driving control device which drives the lens driving device within the driving range set by the driving range setting device.

According to the second aspect of the present invention, the temperature inside the lens barrel of the photographing lens is detected by the temperature detection device. The reference driving range acquisition device acquires the reference driving range of the lens driving device based on the detected temperature of the temperature detection device from the reference driving range storage device. Furthermore, the correction information acquisition device acquires the detected temperature of the temperature detection device for every specified time, obtains a temperature variation and acquires the correction information on the reference driving range according to the temperature variation obtained from the correction information storage device. The driving range setting device corrects the reference driving range of the lens driving device acquired by the reference driving range acquisition device based on the correction information acquired by the correction information acquisition device and sets the driving range of the lens driving device. The driving control device drives the lens driving device within the driving range set by this driving range setting device. In this way, even if a drastic temperature variation occurs, it is possible to drive the lens driving device within an appropriate range and achieve focusing in a short time accurately.

In order to attain the above described object, a third aspect of the present invention is an auto focus apparatus which moves part of a photographing lens through a lens driving device, detects the in-focus position of an object image formed on a photo-receiving surface using an in-focus position detection device and moves the part of the photographing lens to the in-focus position to be detected, comprising a temperature detection device which detects the temperature inside the lens barrel of the photographing lens, a driving range storage device which stores setting information on the driving range of the lens driving device according to the detected temperature of the temperature detection device, storing a reference driving range and an auxiliary driving range which expands the reference driving range as the driving range of the lens driving device, a driving range setting device which acquires the detected temperature of the temperature detection device and acquires the driving range of the lens driving device according to the detected temperature from the driving range storage device and sets the driving range, and a driving control device which drives the lens driving device within the driving range set by the driving range setting device and drives the lens driving device up to the auxiliary driving range only when no in-focus position is detected after driving the lens driving device within the reference driving range.

According to the third aspect, the temperature detection device detects the temperature inside the lens barrel of the photographing lens. The driving range setting device acquires the driving range of the lens driving device based on the detected temperature of the temperature detection device from the driving range storage device and sets the driving range. Here, the driving range of the lens driving device consists of a reference driving range and an auxiliary driving range which expands the reference driving range and the driving control device drives the lens driving device within the reference driving range first. Then, the driving range setting device drives the lens driving device up to the auxiliary driving range only when no in-focus position is detected within this reference driving range. In this way, even if a drastic temperature variation occurs, it is possible to drive the lens driving device within an appropriate range and achieve focusing in a short time accurately.

According to the present invention, even if a drastic temperature variation occurs, it is possible to drive the lens driving device within an appropriate range and achieve focusing in a short time accurately.

DETAILED DESCRIPTION OF THE PREFERRED EMBODIMENTS

With reference now to the attached drawings, embodiments of an auto focus apparatus according to the present invention will be explained in detail below.

Figure 1:
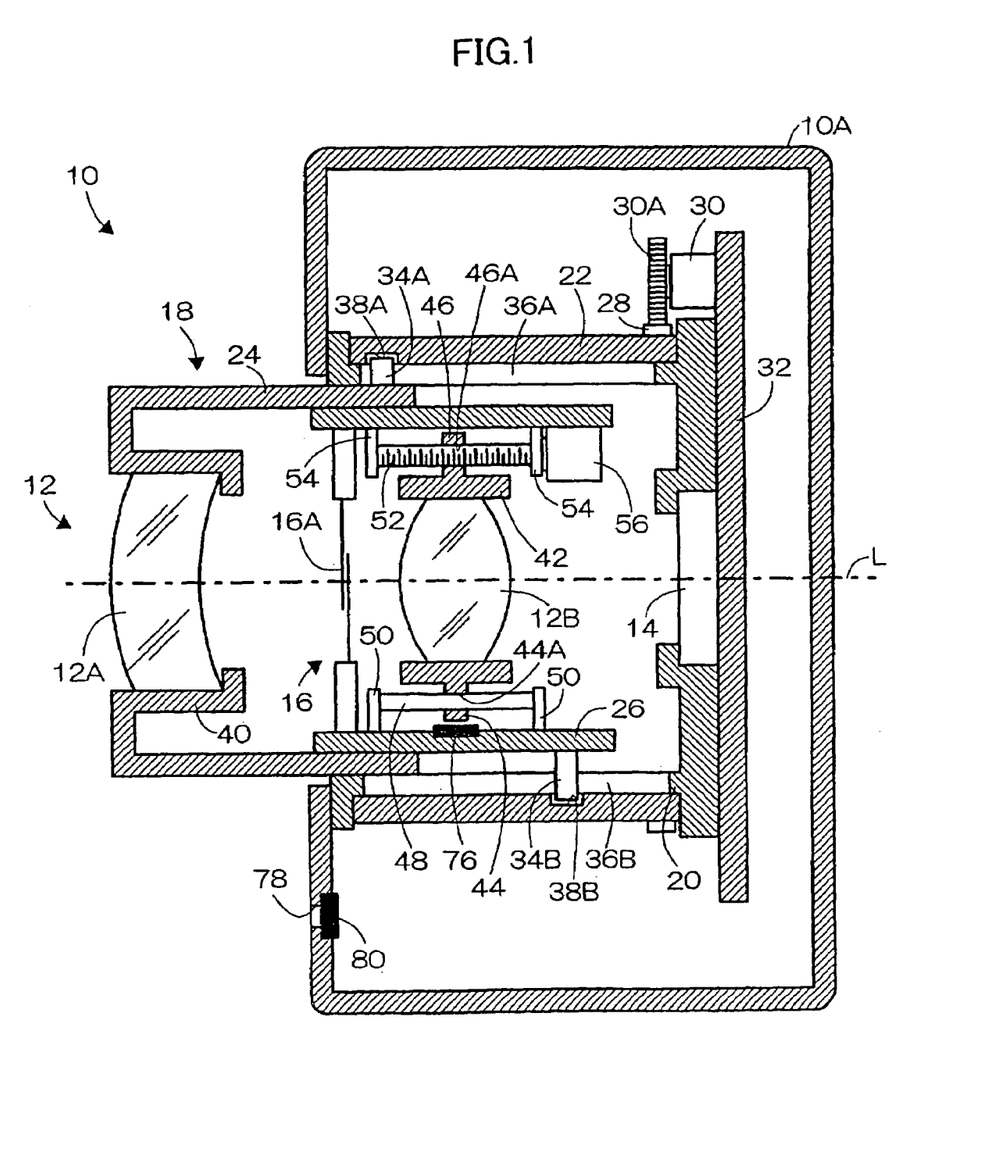
FIG. 1 is a side cross-sectional view showing a structure of main parts of a camera incorporating an auto focus apparatus according to the present invention.

FIG. 1 is a side cross-sectional view showing a structure of main parts of a camera incorporating an auto focus apparatus according to a first embodiment of the present invention. The camera 10 is an electronic camera which converts an optical image of an object formed through a photographing lens 12 to an electric signal by a CCD 14 and records the electric signal as electronic image data in a recording medium.

The photographing lens 12 provided in a camera body 10A is constructed of a fixed lens 12A and a movable lens 12B made up of plastic lenses and incorporates a diaphragm/shutter unit 16. A lens barrel 18 of the photographing lens 12 is constructed of a fixed barrel 20, a rotary barrel 22, a first movable barrel 24 and a second movable barrel 26.

The fixed barrel 20 is fixed inside the camera body 10A using screws (not shown). The rotary barrel 22 is supported on the outer surface of the fixed barrel 20 in a rotatable manner. A gear 28 is formed on the outer surface at the base end of the rotary barrel 22 integral therewith. The gear 28 engages with a drive gear 30A and the drive gear 30A is attached to an output shaft of a rotary barrel drive motor 30. The rotary barrel drive motor 30 is attached to a frame 32 provided at the base end of the fixed barrel 20, and by driving the rotary barrel drive motor 30, the rotary barrel 22 rotates around the outer surface of the fixed barrel 20.

The first movable barrel 24 is disposed in the inner radius part of the fixed barrel 20 and the second movable barrel 26 is disposed in the inner radius part of the first movable barrel 24. Three sets of cam pins 34A, 34B are set in upright position on the outer surfaces of the first movable barrel 24 and second movable barrel 26 respectively (only one set of the respective cam pins is shown in the figure). The cam pins 34A, 34B engage with cam grooves 38A, 38B formed on the inner surface of the rotary barrel 22 via rectilinear movement grooves 36A, 36B formed in the fixed barrel 20. When the rotary barrel 22 is turned, the cam pins 34A, 34B move back and forth by an action between the rectilinear movement grooves 36A, 36B and the cam grooves 38A, 38B, with the result that the first movable barrel 24 and the second movable barrel 26 move back and forth along the optical axis L. When these first movable barrel 24 and second movable barrel 26 move back and forth along the optical axis L, the lens barrel 18 moves forward from the camera body 10A or moves backward to a collapsed position.

The fixed lens 12A is held by a fixed lens frame 40 in the inner radius part at one end of the first movable barrel 24 integral therewith and moves back and forth along the optical axis L together with the first movable barrel 24.

On the other hand, the movable lens 12B is held by a movable lens frame 42 disposed inside the second movable barrel 26. On the outer surface of the movable lens frame 42, a guide section 44 and a nut section 46 are formed in such a way as to protrude in the circumferential direction.

The guide section 44 is provided with a guide hole 44A along the optical axis L and a guide bar 48 passes through the guide hole 44A. The guide bar 48 is disposed inside the second movable barrel 26 along the optical axis and supported by brackets 50 at both ends. The movable lens frame 42 moves back and forth along the optical axis L by the guide section 44 being guided by this guide bar 48.

On the other hand, a screw hole 46A is formed in the nut section 46 along the optical axis L and a threaded bar 52 engages with the screw hole 46A. The threaded bar 52 is disposed inside the second movable barrel 26 along the optical axis L, supported by bearings 54 at both ends in a rotatable manner. The threaded bar 52 is connected to a focus motor 56 and the threaded bar 52 is rotated by driving this focus motor 56. When the threaded bar 52 rotate, the nut section 46 moves along the threaded bar 52 and the movable lens frame 42 moves back and forth along the optical axis L. As a result, the movable lens 12B moves back and forth along the optical axis L.

A diaphragm/shutter unit 16 is provided in the inner radius part at one end of the second movable barrel 26. The diaphragm/shutter unit 16 incorporates a motor (not shown) and stop blades 16A are opened/closed by being driven by this motor. Furthermore, a CCD 14 is mounted in a frame 32 which is mounted on the base end of the fixed barrel 20.

The camera 10 of this embodiment incorporates an auto focus (AF) apparatus 60 which adjusts the focus of an object automatically. AF control in the camera 10 of this embodiment applies contrast AF which moves the movable lens 12B so that a high frequency component of an image signal obtained from the CCD 14 becomes a maximum.

Figure 2:
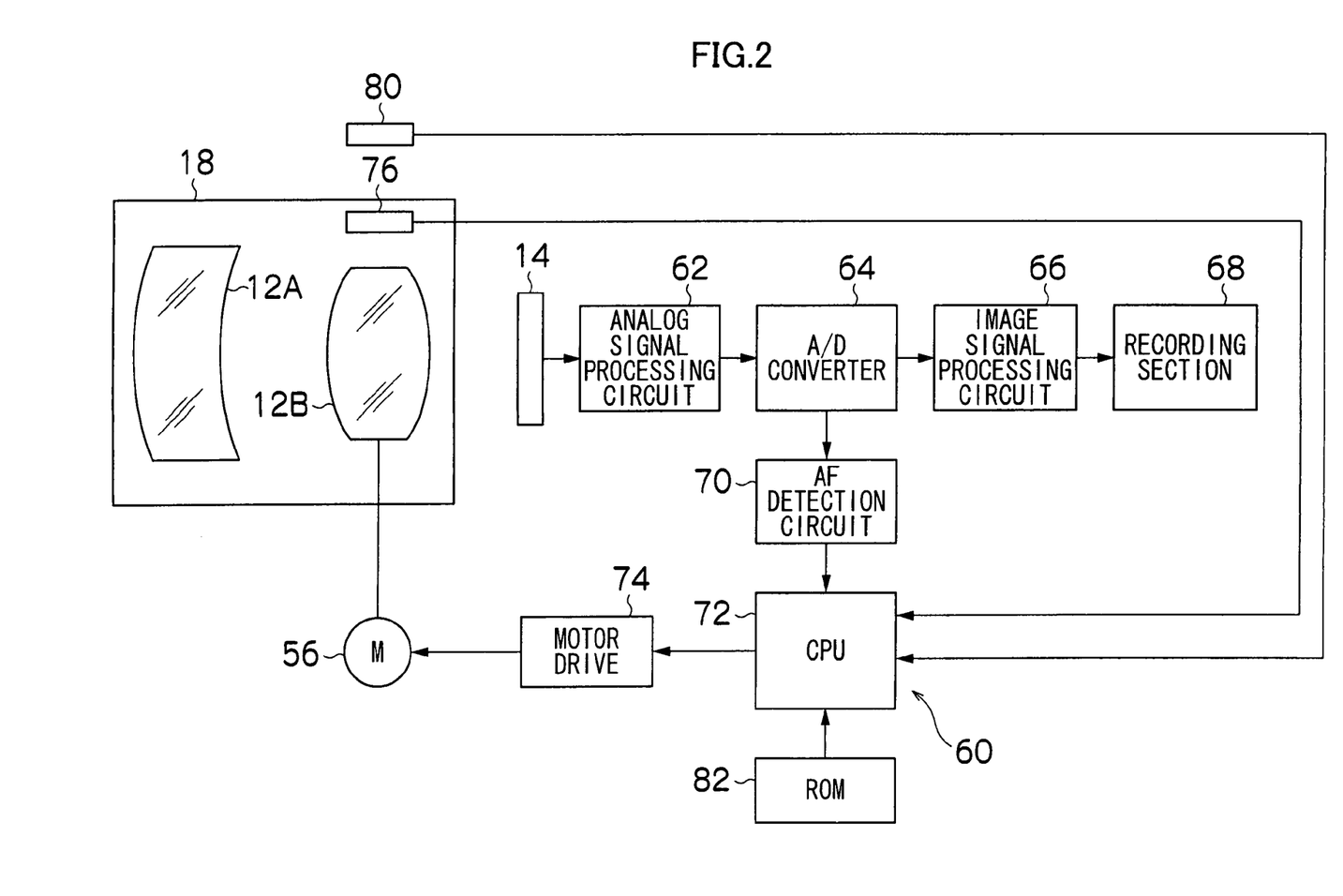
FIG. 2 is a block diagram showing a structure of an auto focus apparatus according to a first embodiment.

FIG. 2 is block diagram showing a structure of the auto focus apparatus 60. Light incident upon the photographing lens 12 penetrates the photo-receiving surface of the CCD 14 via the diaphragm/shutter unit 16. The photo-receiving surface of the CCD 14 is provided with a two-dimensional array of many photosensors and the incident light is converted by the respective photosensors to signal charge whose amount corresponds to the amount of the incident light. In this way, the signal charges stored in the photosensors are sequentially read based on drive pulse given from a timing generator (not shown) as voltage signals (image signals) according to the signal charges.

The image signal read from the CCD 14 is input to an analog signal processing circuit 62, subjected to sample-and-hold processing (correlated double sampling processing), amplified and then input to an A/D converter 64 where the image signal is converted to a digital image signal. When the image signal is recorded as image data, the image signal is subjected to predetermined signal processing by an image signal processing circuit 66 and then recorded in a recording section 68.

On the other hand, during an AF operation, the A/D-converted image signal is also input to an AF detection circuit 70. The AF detection circuit 70 is constructed of a highpass filter which only lets pass a high-frequency component of the image signal, an absolute value processing section, an AF area extraction section which extracts a signal within a predetermined focus area (e.g., central part of a screen) and a integrating section which integrates absolute value data in the AF area, etc. The integrated value data calculated by the AF detection circuit 70 is notified to a CPU 72.

Figure 3:
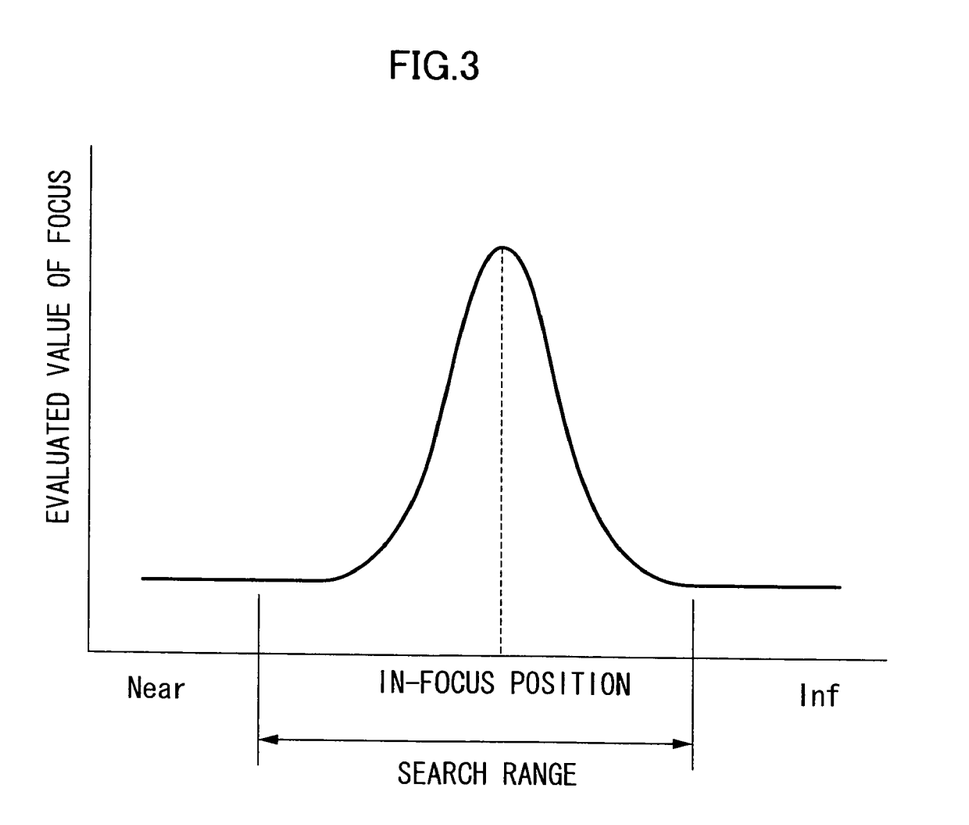
FIG. 3 illustrates an in-focus position detection method according to a contrast AF method.

The CPU 72 controls a focus motor 56 through a motor driver 74 to move the movable lens 12B from the minimum object distance (Near) side to the infinity (Inf) side within a predetermined movable range (search range). Then, as shown in FIG. 3, in the process of moving the movable lens 12B from the Near side to the Inf side, evaluated values of focus are calculated at predetermined intervals and a position at which the evaluated value of focus reaches a maximum is determined. Then, the calculated position is designated as an in-focus position and the focus motor 56 is driven through the motor driver 74 so that the movable lens 12B moves to the in-focus position. Auto focusing of the object is realized in this way.

When a plastic lens is used for the photographing lens 12, the image forming position may be deviated due to a temperature variation and the search range of focusing may be exceeded depending on the amount of deviation, which prevents focusing.

On the other hand, expanding the focus search range to solve this problem causes another problem that focusing takes a long time.

There is also a method of correcting the focus search range according to the temperature variation, but even if the focus search range is simply corrected according to a temperature variation, when a drastic temperature variation occurs, a difference is produced between the detected temperature by a temperature sensor and the actual temperature in the lens, which may prevent focusing.

Therefore, the auto focus apparatus 60 of the first embodiment detects the temperature inside the lens barrel and temperature outside the lens barrel and corrects the focus search range based on the difference therebetween so that focusing can be achieved immediately even if a drastic temperature variation occurs.

As shown in FIG. 1, a first temperature sensor 76 which detects the temperature inside the lens barrel 18 is provided inside the second movable barrel 26 which makes up the lens barrel 18 of the photographing lens 12.

Furthermore, a measuring window 78 is formed on the surface of the camera body 10A and a second temperature sensor 80 for detecting outside temperature of the lens barrel 18 is provided inside the measuring window 78.

The detected temperatures of the first temperature sensor 76 and the second temperature sensor 80 are output to the CPU 72 and the CPU 72 sets the focus search range, that is, the driving range of the focus motor 56, based on the detected temperatures $T_1$, $T_2$ of the first temperature sensor 76 and second temperature sensor 80.

Figure 4:
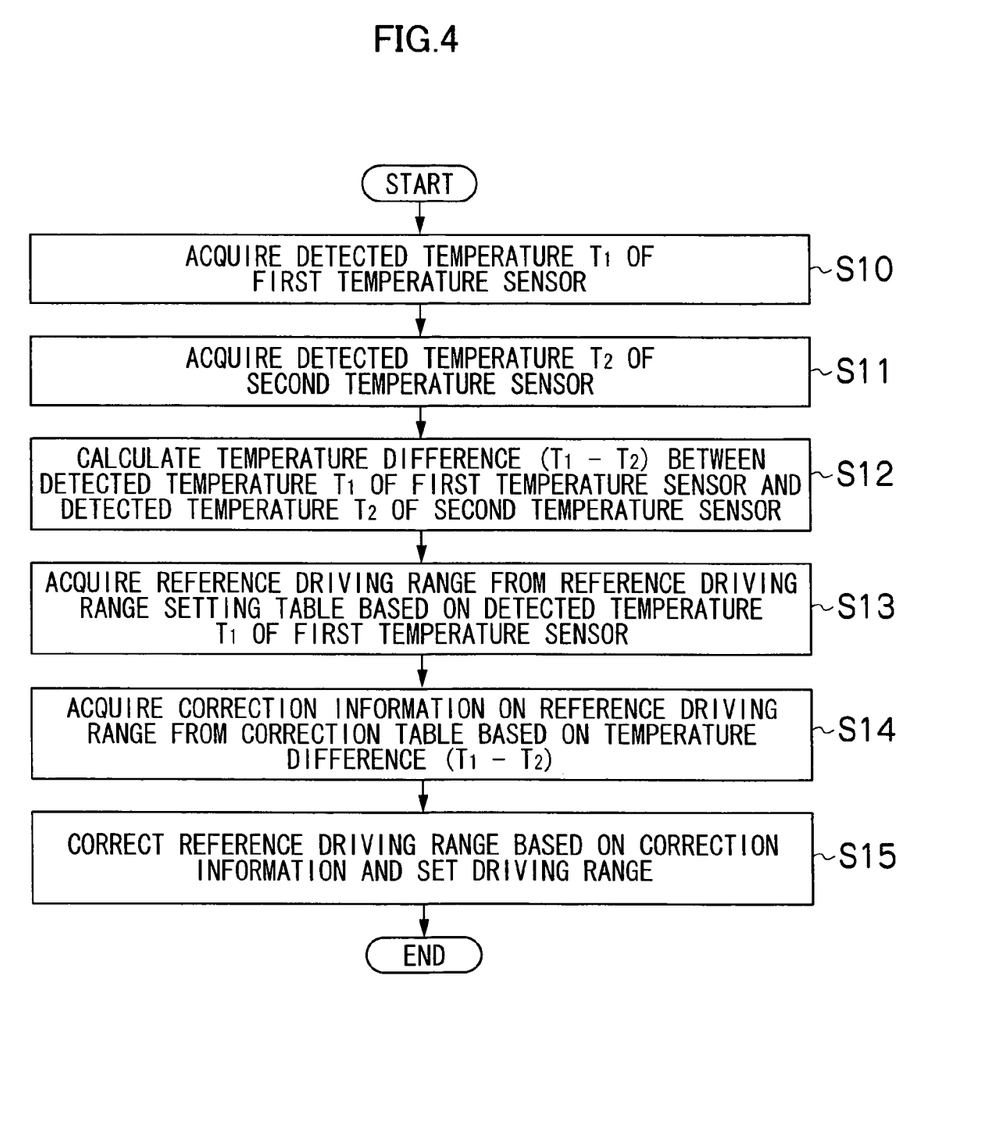
FIG. 4 is a flow chart showing a procedure for setting the driving range of a focus motor.

Hereinafter, the procedure for setting the driving range of the focus motor 56 will be explained according to the flow chart shown in FIG. 4.

First, the CPU 72 acquires a temperature $T_1$ inside the lens barrel 18 from the first temperature sensor 76 (step S10). Then, the CPU 72 likewise acquires a temperature $T_2$ outside the lens barrel 18 from the second temperature sensor 80 (step S11). The CPU 72 calculates a temperature difference $(T_1-T_2)$ between the acquired detected temperature $T_1$ of the first temperature sensor 76 and the detected temperature $T_2$ of the second temperature sensor 80 (step S12).

Figure 5:
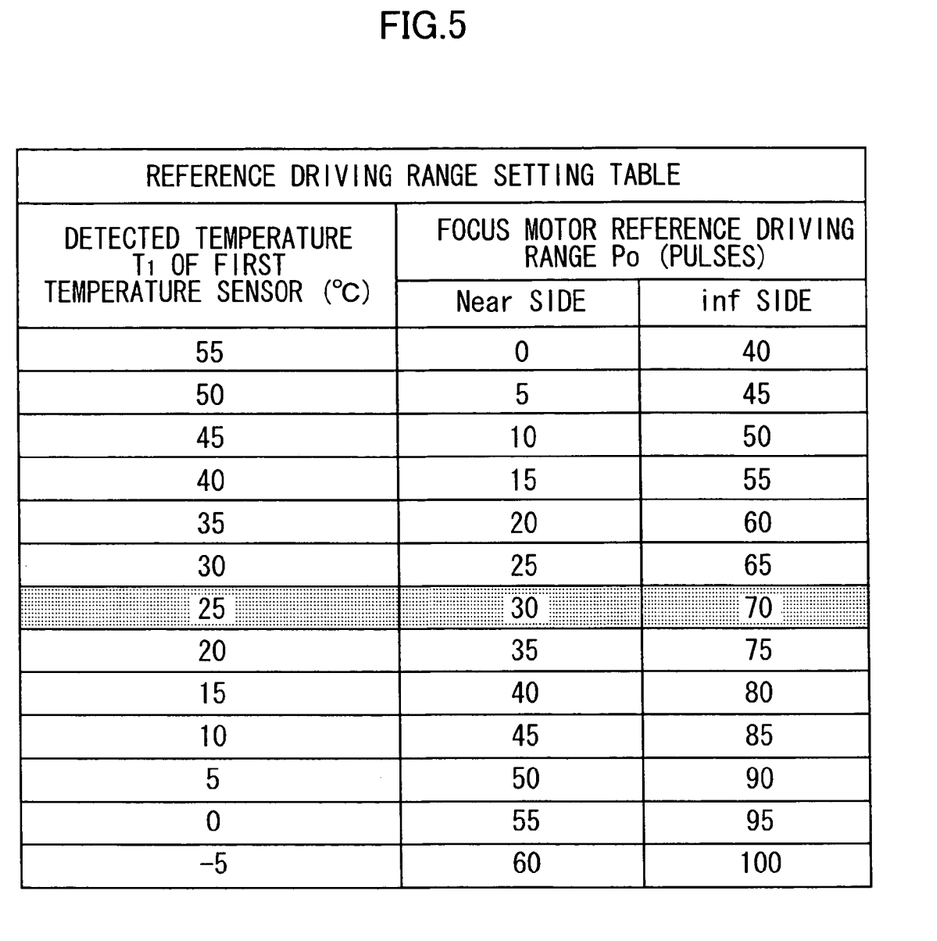
FIG. 5 illustrates an example of a reference driving range setting table.

Then, the CPU 72 acquires a reference driving range Po of the focus motor 56 from a ROM 82 based on the detected temperature $T_1$ of the first temperature sensor 76 (step S13). Here, as shown in FIG. 5, the ROM 82 stores setting information on the reference driving range Po of the focus motor 56 according to the detected temperature $T_1$ of the first temperature sensor 76 as a "reference driving range setting table" and the CPU 72 acquires the reference driving range Po of the focus motor 56 according to the detected temperature $T_1$ from the reference driving range setting table. Assuming that the focus motor 56 is constructed of a pulse motor, the camera 10 of the first embodiment defines the reference driving range Po using driving pulses. In the case of the reference driving range setting table shown in FIG. 5, when the detected temperature $T_1$ of the first temperature sensor 76 is 25° C., the reference driving range Po of the focus motor 56 is set to 30 to 70 (pulses).

In the reference driving range setting table, an amount of movement of the image forming position with respect to the lens temperature of the photographing lens is predetermined and the reference driving range is set for each temperature according to the amount of movement calculated. The reference driving range setting table shown in FIG. 5 shows settings of an optical system in which the image forming position moves by one pulse of the focus motor 56 every time the lens temperature of the photographing lens changes by 1° C.

Next, the CPU 72 acquires correction information of the reference driving range Po based on the temperature difference $(T_1-T_2)$ between the detected temperature $T_1$ of the first temperature sensor 76 and the detected temperature $T_2$ of the second temperature sensor 80 from the ROM 82 (step S14). Here, as shown in FIG. 6, the ROM 82 stores correction information of the reference driving range Po corresponding to the temperature difference $(T_1-T_2)$ between the detected temperature $T_1$ of the first temperature sensor 76 and the detected temperature $T_2$ of the second temperature sensor 80 as a "correction table", and the CPU 72 acquires correction information X corresponding to the temperature difference $(T_1-T_2)$ from the correction table.

Figure 6:
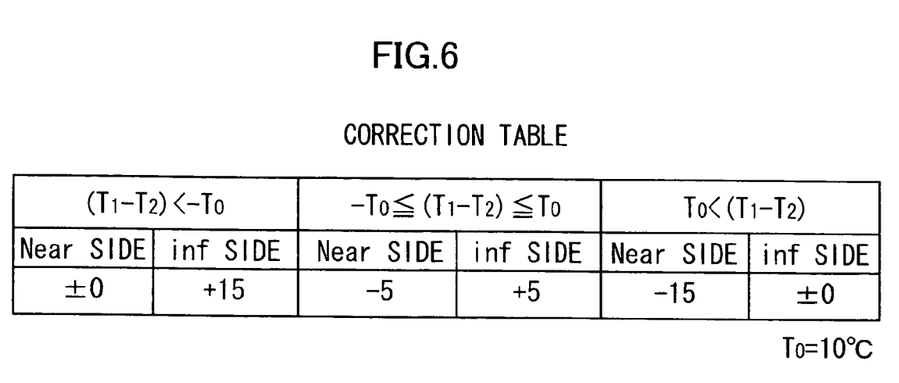
FIG. 6 illustrates an example of a correction table.

As shown in FIG. 6, the correction table defines an amount of correction on the Near side of the reference driving range Po and an amount of correction on the Inf side corresponding to the temperature difference $(T_1-T_2)$. In the case of this example, as shown in FIG. 6, the temperature difference $(T_1-T_2)$ is defined for three different cases; when $(T_1-T_2)<-T_0$, when $-T_0 \leq (T_1-T_2) \leq T_0$ and when $T_0 < (T_1-T_2)$.

Figure 7:
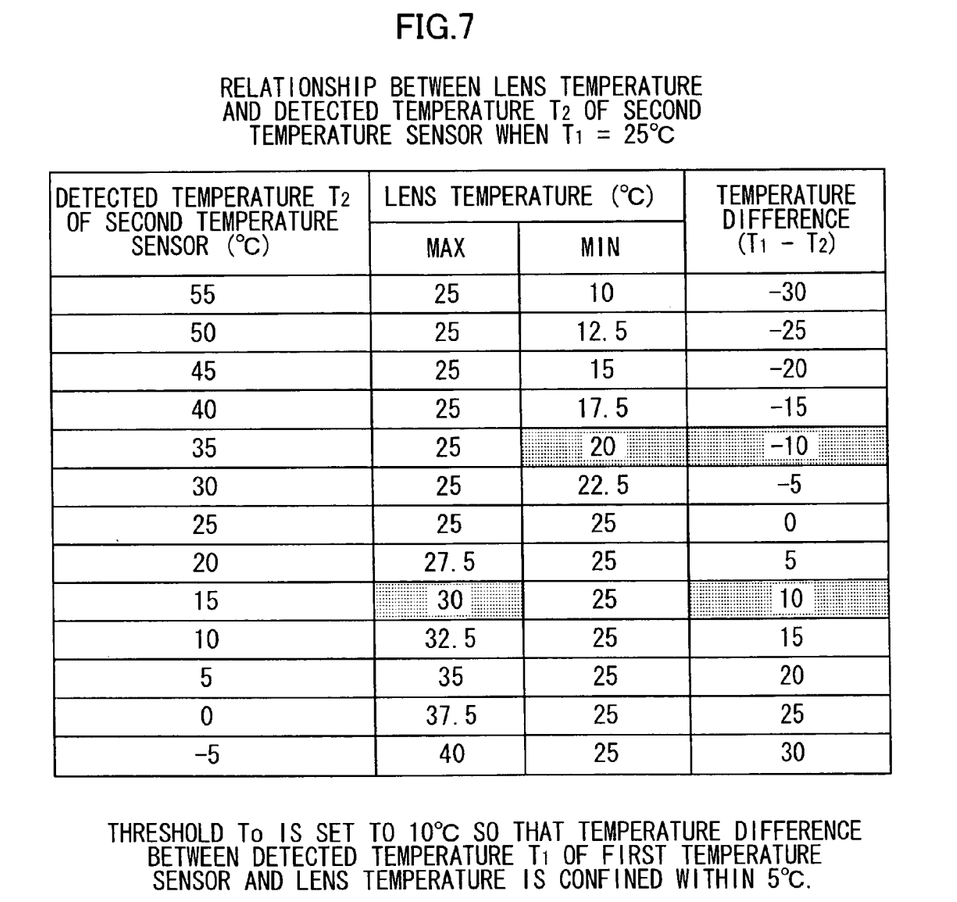
FIG. 7 illustrates a threshold setting method.

Here, the threshold $T_0$ which delimits the temperature difference range is set as the temperature to confine the difference between the detected temperature $T_1$ of the first temperature sensor 76 and the lens temperature within a specified value. For example, the table shown in FIG. 7 shows the relationship between the lens temperature when the detected temperature $T_1$ of the first temperature sensor 76 is 25° C. and the detected temperature $T_2$ of the second temperature sensor 80 in the optical system in which the reference driving range table shown in FIG. 5. As shown in FIG. 7, when the difference between the detected temperature $T_1$ of the first temperature sensor 76 and the lens temperature is confined within 25° C. ±5° C. (i.e., 20° C.–30° C.), the threshold $T_0$ should be set to 10° C. The correction table shown in FIG. 6 defines the amount of correction when the threshold $T_0$ is set to 10° C. in the optical system for which the reference driving range table shown in FIG. 5 is set.

In the case of the correction table shown in FIG. 6, when the temperature difference $(T_1-T_2)$ between the detected temperature $T_1$ of the first temperature sensor 76 and the detected temperature $T_2$ of the second temperature sensor 80 is 10° C. ($T_1$=25° C., $T_2$=15° C.), $-T_0 \leq (T_1-T_2) \leq T_0$ and the correction information X becomes −5 (pulses) on the Near side and +5 (pulses) on the Inf side.

The CPU 72 corrects the reference driving range Po based on the correction information X acquired in this way and sets the driving range P of the focus motor 56 (step S15).

For example, in the case of the above described example, the reference driving range Po is 30 to 70 (pulses) and the correction information X is −5 (pulse) on the Near side and +5 (pulses) on the Inf side, and therefore the driving range P of the focus motor 56 is set to 25 to 75 (pulses).

The CPU 72 drives the focus motor 56 based on the driving range P set in this way and moves the movable lens 12B from the Near side to the Inf side. In the process of moving the movable lens 12B, the CPU 72 calculates an evaluated value of focus at predetermined intervals (for each drive pulse) and calculates the position (in-focus position) at which the evaluated value of focus becomes a maximum. The CPU 72 outputs a command to the motor driver 74 so that the movable lens 12B moves to the in-focus position calculated and drives the focus motor 56. Auto focusing of the object is realized in this way.

As shown above, according to the auto focus apparatus 60 of the embodiment, the driving range of the focus motor 56 is corrected to an appropriate range based on the temperature difference between inside and outside the lens barrel 18, and therefore it is possible to effectively avoid the problem of focus detection being disabled even if a drastic temperature variation occurs. Furthermore, since the focus motor 56 is always driven within an appropriate range, in-focus search requires no extra time, allowing speedy focusing.

The above described embodiment has not explained timing of executing AF. The AF is operated, for example, by pressing a release button (not shown) provided for the camera body 10A halfway down. By detecting the halfway pressing of the release button, the CPU 72 acquires the detected temperatures from the first temperature sensor 76 and second temperature sensor 80, sets the driving range of the focus motor 56 and executes the AF.

Figure 8:
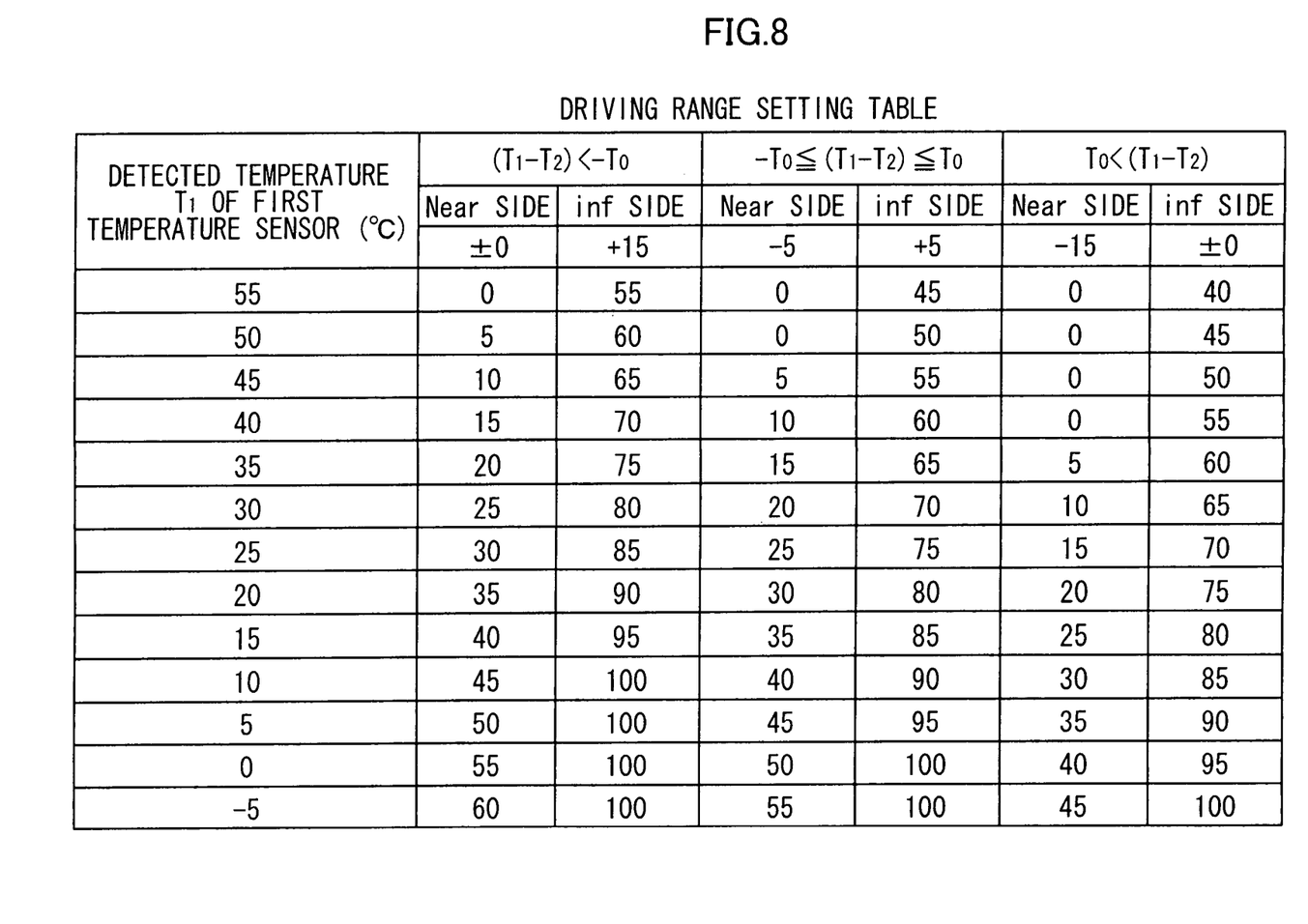
FIG. 8 illustrates an example of a driving range setting table.

Furthermore, the auto focus apparatus 60 of the first embodiment acquires the correction information from the correction table based on the temperature difference ($T_1$–$T_2$) between the detected temperature $T_1$ of the first temperature sensor 76 and the detected temperature $T_2$ of the second temperature sensor 80, corrects the reference driving range based on the correction information and sets the driving range of the focus motor 56, but as shown in FIG. 8, it is also possible to create a driving range setting table which is the reference driving range setting table corrected based on the correction information beforehand and set the driving range of the focus motor 56 based on this driving range setting table. In this case, it is possible to uniquely set the driving range of the focus motor 56 from the detected temperature $T_1$ of the first temperature sensor 76 and the temperature difference ($T_1$–$T_2$). For example, when the detected temperature $T_1$ of the first temperature sensor 76 is 25° C. and the detected temperature $T_2$ of the second temperature sensor 80 is 20° C., the temperature difference ($T_1$–$T_2$) is 5° C. and the driving range of the focus motor 56 is set to 25 (Near side) to 75 (Inf side) from the driving range setting table.

Furthermore, the auto focus apparatus 60 of the first embodiment sets the first temperature sensor 76 for detecting the temperature inside the lens barrel 18 inside the second movable barrel 26, but the position of the first temperature sensor 76 is not limited to inside the second movable barrel 26 and any position is acceptable if it is at least a position at which the temperature inside the lens barrel 18 can be detected. Similarly, the second temperature sensor 80 for detecting the temperature outside the lens barrel 18 is set in the vicinity of the surface of the camera body 12, but the position is not limited to this position and any position is acceptable if it is at least a position at which the temperature outside the lens barrel 18 (external temperature) can be detected.

Next, a second embodiment of an auto focus apparatus according to the present invention will be explained.

Figure 9:
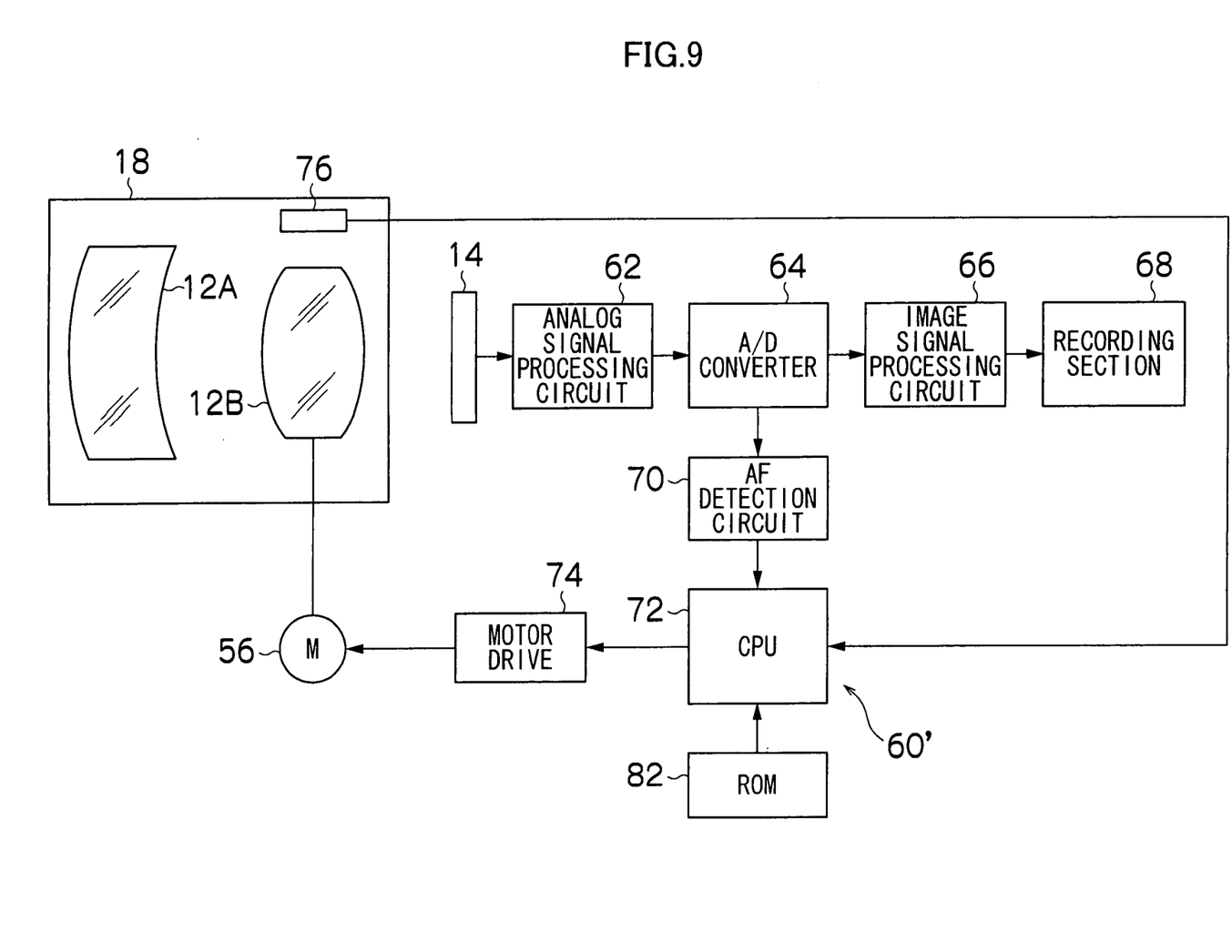
FIG. 9 is block diagram showing a structure of an auto focus apparatus according to a second embodiment.

FIG. 9 is a block diagram of the auto focus apparatus 60' according to the second embodiment. As shown in FIG. 9, the auto focus apparatus 60' of the second embodiment has a structure equivalent to the auto focus apparatus 60 of the first embodiment without the second temperature sensor 80. The same components as those of the auto focus apparatus 60 of the above described first embodiment are assigned the same reference numerals and explanations thereof will be omitted.

The auto focus apparatus 60 of the first embodiment corrects the reference driving range based on the temperature difference between inside and outside the lens barrel and sets the driving range of the focus motor, but the auto focus apparatus 60' of the second embodiment corrects the reference driving range based on a temperature variation with time and sets the driving range of the focus motor.

Figure 10:
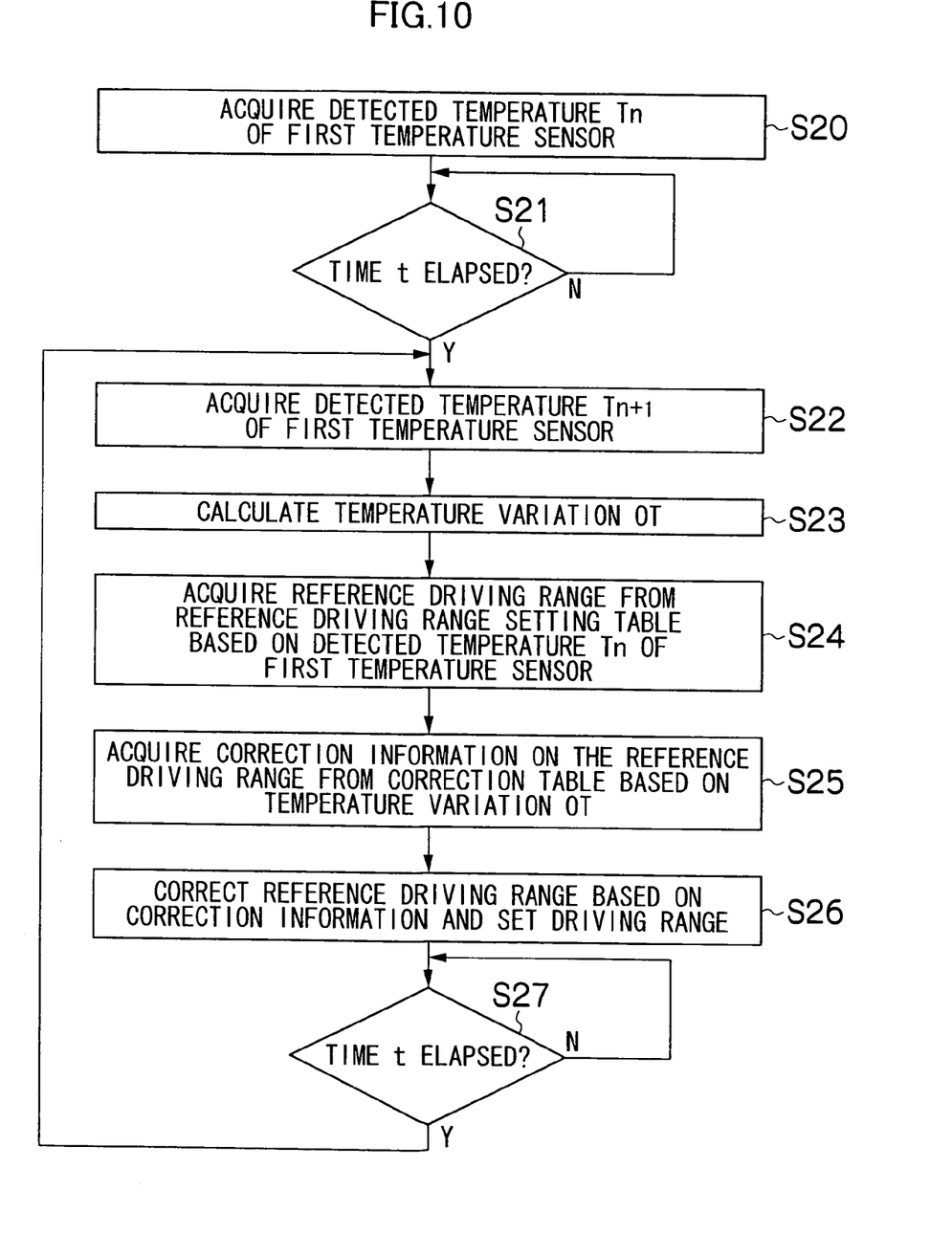
FIG. 10 is a flow chart showing a procedure for setting the driving range of a focus motor.

Hereinafter, the procedure for setting the driving range of the focus motor of the auto focus apparatus 60' of the second embodiment will be explained using the flow chart shown in FIG. 10.

First, the CPU 72 acquires a temperature $T_n$ inside the lens barrel 18 from a first temperature sensor 76 (step S20).

Next, the CPU 72 measures time using a built-in timer and decides whether a specified time t has passed from the previous temperature detection or not (step S21).

When the specified time t has passed, the CPU 72 acquires a temperature $T_{n+1}$ inside the lens barrel 18 from the first temperature sensor 76 (step S22). The CPU 72 calculates the difference ($T_n$–$T_{n+1}$) between the previously detected temperature $T_n$ and the newly detected temperature $T_{n+1}$ and calculates a temperature variation $\Delta T$ which has occurred within the specified time t (step S23).

Next, the CPU 72 acquires the reference driving range of the focus motor 56 based on the detected temperature $T_{n+1}$ of the first temperature sensor 76 from the ROM 82 (step S24). Here, the ROM 82 stores setting information on the reference driving range of the focus motor 56 corresponding to the detected temperature T of the first temperature sensor 76 as a "reference driving range setting table" and the CPU 72 acquires the reference driving range of the focus motor 56 corresponding to the detected temperature $T_{n+1}$ from the reference driving range setting table (see FIG. 5).

Next, the CPU 72 acquires correction information on the reference driving range based on the temperature variation $\Delta T$ from the ROM 82 (step S25). Here, the ROM 82 stores correction information on the reference driving range according to the temperature variation $\Delta T$ as a "correction table" and the CPU 72 acquires correction information according to the temperature variation $\Delta T$ from the correction table.

As in the case of the auto focus apparatus of the above described first embodiment, the correction table defines the amount of correction of the reference driving range on the Near side and the amount of correction on the Inf side according to the temperature variation $\Delta T$. As in the case of the auto focus apparatus of the above described first embodiment, this embodiment will set the temperature variation $\Delta T$ in three different cases, that is, when $\Delta T<-T_0$, when $-T_0 \leq \Delta T \leq T_0$ and when $T_0 < \Delta T$ (see FIG. 6).

Next, the CPU 72 corrects the reference driving range based on the acquired correction information and sets the driving range of the focus motor 56 (step S26).

Here, when an execution command of AF processing is issued, the CPU 72 drives the focus motor 56 based on the set driving range and moves the movable lens 12B from the Near side to the Inf side. Then, in the process of driving, the CPU 72 calculates the in-focus position of the photographing lens 12 and moves the movable lens 12B to the calculated in-focus position.

As described above, when the driving range of the focus motor 56 is set, the CPU 72 decides whether a specified time t has passed from the previous temperature detection or not (step S27). When it decides that the specified time t has passed, the CPU 72 returns to step S22 and acquires a temperature $T_{n+1}$ inside the lens barrel 18 from the first temperature sensor 76. Then, the CPU 72 calculates a difference ($T_n$–$T_{n+1}$) between the previous detected temperature $T_n$ and the newly detected temperature $T_{n+1}$ and calculates the temperature variation ΔT which has occurred within the specified time t (step S23). Then, the CPU 72 acquires the reference driving range and correction information (steps S24, 25), corrects the acquired reference driving range based on the correction information and sets the driving range of the focus motor 56 (step S26).

The CPU 72 detects the temperature in the lens barrel and calculates a temperature variation every specified time t and acquires a new driving range, and so forth.

Thus, the auto focus apparatus 60' of the second embodiment corrects the driving range of the focus motor 56 so as to be confined within an appropriate range based on a temperature variation that occurs within a specified time, and can thereby effectively prevent the problem of focus detection being disabled even when a drastic temperature variation occurs. Moreover, the auto focus apparatus of this embodiment can always drive the focus motor 56 within an appropriate range, and can thereby take no extra time for focus search and achieve speedy focusing.

As in the case of the first embodiment, the auto focus apparatus 60' of the second embodiment also creates a driving range setting table which is the reference driving range setting table corrected based on correction information beforehand and sets the driving range of the focus motor 56 based on this driving range setting table (see FIG. 8).

Next, a third embodiment of an auto focus apparatus according to the present invention will be explained.

The auto focus apparatus according to the third embodiment sets the focus motor driving range according to the detected temperature in the lens barrel. The driving range consists of two driving ranges; a reference driving range and auxiliary driving range and an in-focus position is detected within the reference driving range first. Then, only when the in-focus position is not detected within this reference driving range, the focus motor is driven up to the auxiliary driving range and the in-focus position is detected.

Figure 11:
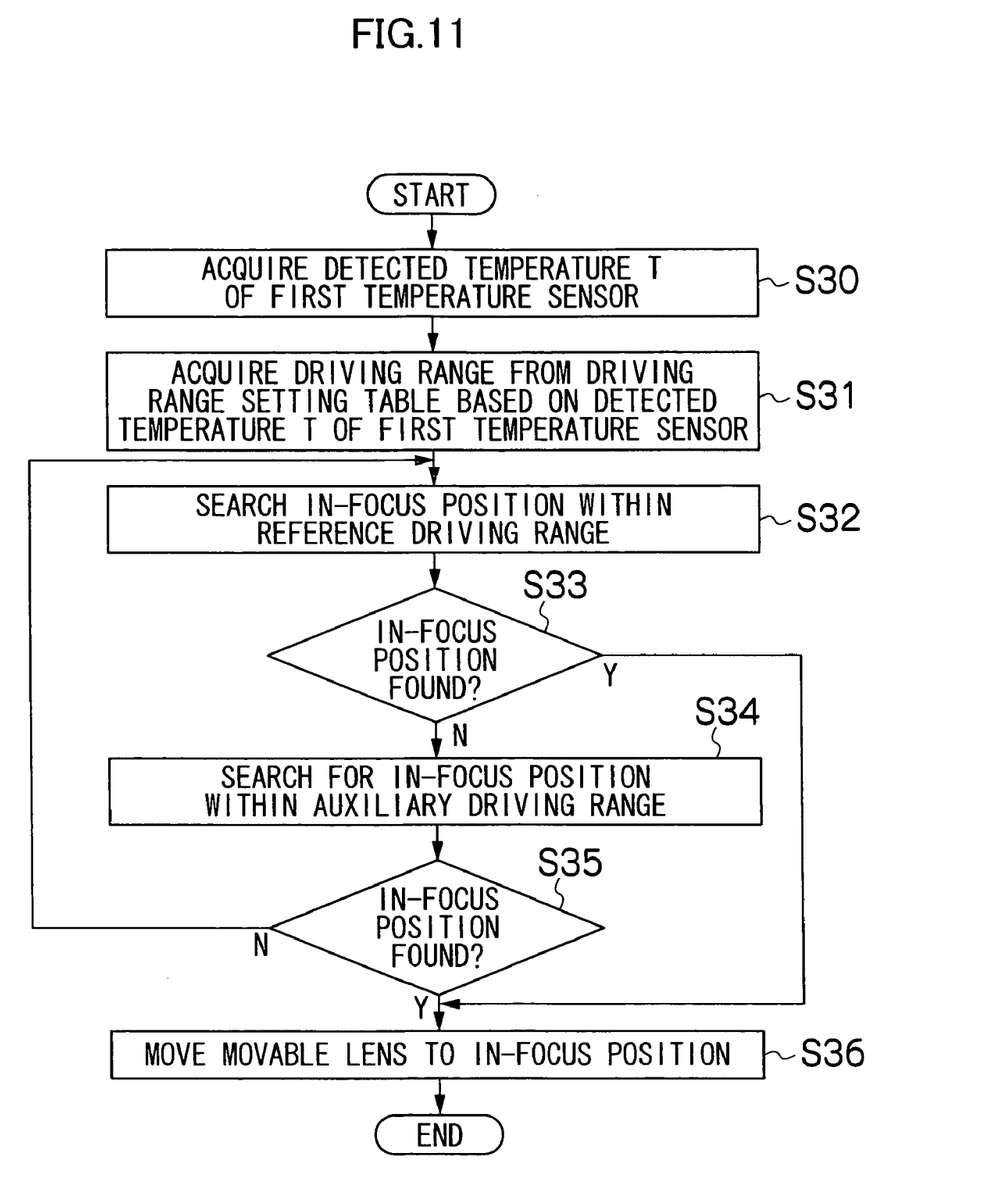
FIG. 11 is a flow chart showing a procedure for detecting an in-focus position of an auto focus apparatus according to a third embodiment.

Hereinafter, the procedure for detecting the in-focus position at the auto focus apparatus of the third embodiment will be explained according to the flow chart shown in FIG. 11. The apparatus structure is the same as the auto focus apparatus 60' according to the second embodiment, and therefore explanations thereof will be omitted.

When a command for execution of AF processing is issued, the CPU 72 acquires a temperature T inside a lens barrel 18 from a first temperature sensor 76 (step S30). Then, the driving range of a focus motor 56 is acquired from a ROM 82 based on the detected temperature T (step S31).

The ROM 82 stores setting information on the driving range of the focus motor 56 corresponding to the detected temperature T of the first temperature sensor 76 as a "dynamic range setting table" and a CPU 72 acquires the driving range of the focus motor 56 corresponding to the detected temperature T from the driving range setting table.

Figure 12A:
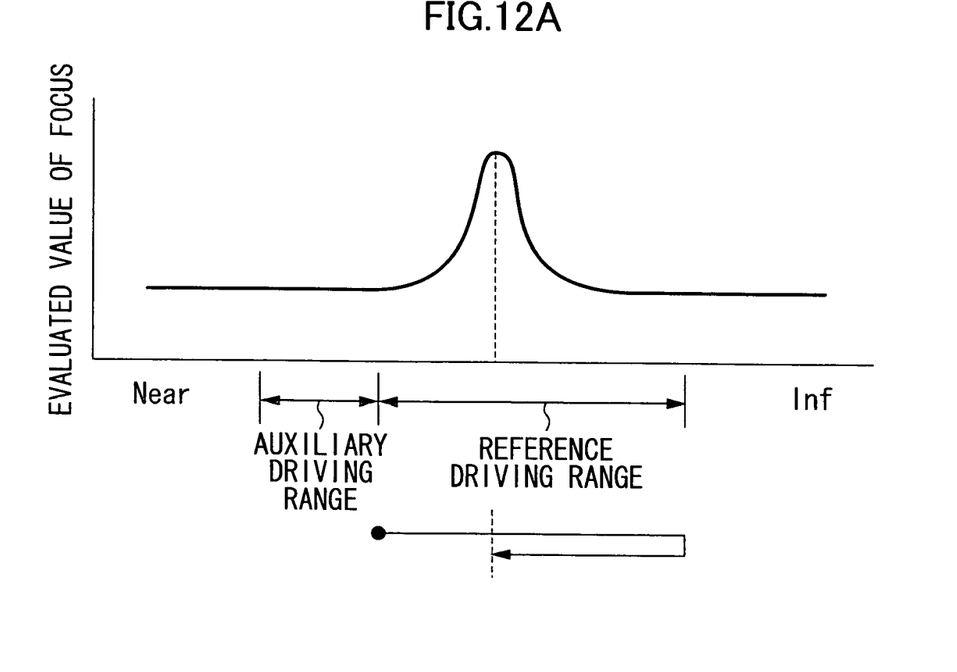
FIGS. 12A and 12B illustrate an in-focus position detection method by an auto focus apparatus according to third embodiment.
Figure 12B:
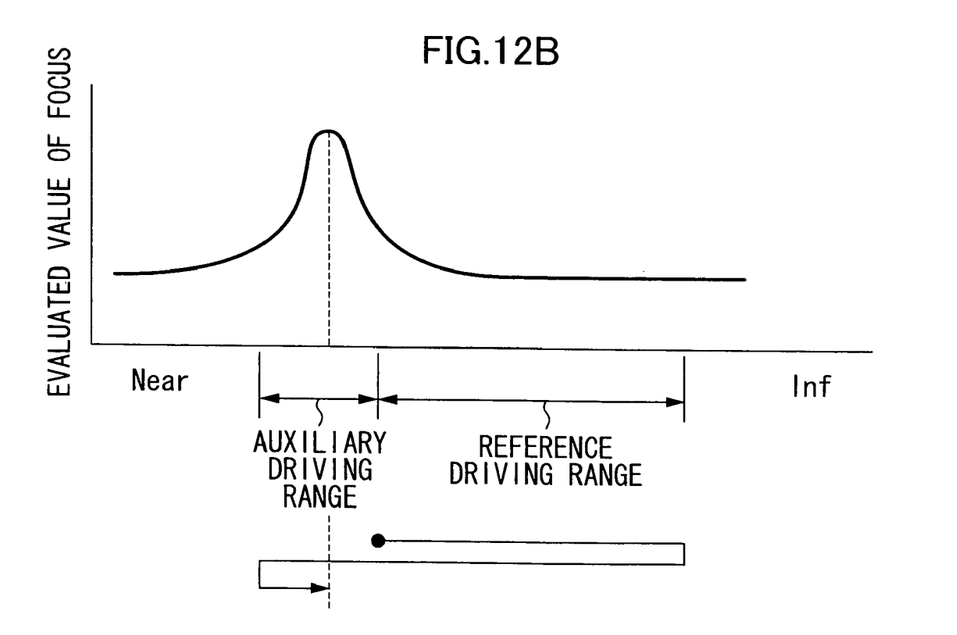

Here, the driving range consists of a "reference driving range" and an "auxiliary driving range" and the auxiliary driving range is set ahead of a search start point (point at which detection of an in-focus position is started) of the reference driving range. That is, as shown in FIG. 12, when the movable lens 12B is moved from the Near side to the Inf side to detect the in-focus position, the auxiliary driving range is set to the Near side of the reference driving range. On the contrary, when the movable lens 12B is moved from the Inf side to the Near side to detect the in-focus position, the auxiliary driving range is set to the Inf side of the reference driving range.

Next, the CPU 72 drives the focus motor 56 based on the acquired driving range to detect the in-focus position.

In this case, the CPU 72 drives the focus motor 56 from the Near end (search start point) to the Inf side of the reference driving range to detect the in-focus position. That is, the CPU 72 drives the focus motor 56 within the reference driving range to detect the in-focus position (step S32). Then, the CPU 72 decides whether any in-focus position is found within this reference driving range or not (step S33).

Here, as shown in FIG. 12A, when the in-focus position is detected within the reference driving range, the focus motor 56 is driven so that the movable lens 12B moves to the detected in-focus position after the Inf end of the reference driving range is reached (step S36).

On the other hand, when the in-focus position is not detected within the reference driving range, after the Inf end of the reference driving range is reached, the focus motor 56 is driven toward the Near end of the reference driving range. After the Near end (search start point) in the reference driving range is reached, the focus motor 56 is driven to the Near side to detect the in-focus position. That is, as shown in FIG. 12B, the focus motor 56 is driven within the auxiliary driving range to detect the in-focus position (step S34). Then, it is decided whether the in-focus position is found within this reference driving range or not (step S35).

When the in-focus position is detected within this auxiliary driving range, the focus motor 56 is driven so that after the Near end of the auxiliary driving range is reached, the movable lens 12B is moved to the detected in-focus position (step S36).

On the other hand, when the in-focus position is detected within the auxiliary driving range, the focus motor 56 is driven toward the Near end (search start point) of the reference driving range after the Near end of the auxiliary driving range is reached and the in-focus position is detected within the reference driving range again.

Thus, the auto focus apparatus of the third embodiment expands the detection range up to the auxiliary driving range to detect the in-focus position only when the in-focus position is not detected within the reference driving range, and therefore there is no need for unnecessary search and it is possible to realize speedy and exact focusing.

The above described series of embodiments has explained the case where the present invention is applied to an auto focus apparatus which detects an in-focus position according to a contrast AF method as an example, but the present invention is not limited to the example.

Furthermore, the above described series of embodiments has explained the case where the present invention is applied to an auto focus apparatus built in a digital camera as an example, but application of the present invention is not limited to the example.

What is claimed is:

1. An auto focus apparatus which moves part of a photographing lens through a lens driving device, detects an in-focus position of an object image formed on a photo-receiving surface using an in-focus position detection device and moves the part of the photographing lens to the in-focus position to be detected, comprising:

a first temperature detection device which detects a temperature inside a lens barrel of the photographing lens;

a second temperature detection device which detects a temperature outside the lens barrel of the photographing lens;

a reference driving range storage device which stores setting information on a reference driving range of the lens driving device according to the detected temperature of the first temperature detection device;

a correction information storage device which stores correction information on the reference driving range of the lens driving device according to a temperature difference between the detected temperature of the first temperature detection device and the detected temperature of the second temperature detection device;

a reference driving range acquisition device which acquires the detected temperature of the first temperature detection device and acquires the reference driving range of the lens driving device according to the detected temperature from the reference driving range storage device;

a correction information acquisition device which acquires the detected temperature of the first temperature detection device and the detected temperature of the second temperature detection device, calculates a difference between the two detected temperatures and acquires correction information on the reference driving range of the lens driving device according to the difference from the correction information storage device;

a driving range setting device which corrects the reference driving range of the lens driving device acquired by the reference driving range acquisition device based on the correction information acquired by the correction information acquisition device and sets a driving range of the lens driving device; and a driving control device which drives the lens driving device within the driving range set by the driving range setting device.

2. An auto focus apparatus which moves part of a photographing lens through a lens driving device, detects an in-focus position of an object image formed on a photo-receiving surface using an in-focus position detection device and moves the part of the photographing lens to the in-focus position to be detected, comprising:

a temperature detection device which detects a temperature inside the lens barrel of the photographing lens;

a reference driving range storage device which stores setting information on a reference driving range of the lens driving device according to the detected temperature of the temperature detection device;

a correction information storage device which stores correction information on a reference driving range of the lens driving device according to a temperature variation that occurs within a specified time;

a reference driving range acquisition device which acquires the detected temperature of the temperature detection device and acquires the reference driving range of the lens driving device according to the detected temperature from the reference driving range storage device;

a correction information acquisition device which acquires the detected temperature of the temperature detection device for every specified time, obtains a temperature variation and acquires correction information on the reference driving range of the lens driving device according to the temperature variation from the correction information storage device;

a driving range setting device which corrects the reference driving range of the lens driving device acquired by the reference driving range acquisition device based on the correction information acquired by the correction information acquisition device and sets the driving range of the lens driving device; and a driving control device which drives the lens driving device within the driving range set by the driving range setting device.

3. An auto focus apparatus which moves part of a photographing lens through a lens driving device, detects an in-focus position of an object image formed on a photo-receiving surface using an in-focus position detection device and moves the part of the photographing lens to the in-focus position to be detected, comprising:

a temperature detection device which detects the temperature inside the lens barrel of the photographing lens;

a driving range storage device which stores setting information on the driving range of the lens driving device according to the detected temperature of the temperature detection device, storing a reference driving range and an auxiliary driving range which expands the reference driving range as the driving range of the lens driving device;

a driving range setting device which acquires the detected temperature of the temperature detection device and acquires the driving range of the lens driving device according to the detected temperature from the driving range storage device and sets the driving range; and a driving control device which drives the lens driving device within the driving range set by the driving range setting device and drives the lens driving device up to the auxiliary driving range only when no in-focus position is detected after driving the lens driving device within the reference driving range.

* * * * *